Nov. 4, 1969  W. E. McCOWN ETAL  3,476,539
PRODUCING SHEET GLASS
Filed April 28, 1967  3 Sheets-Sheet 1
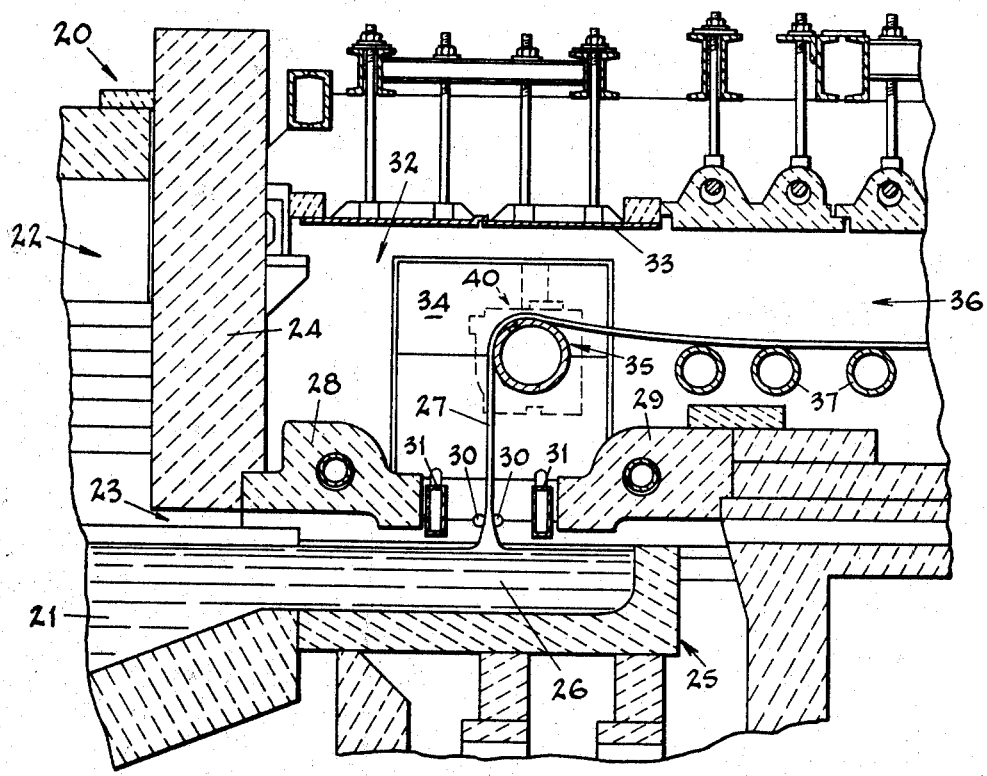
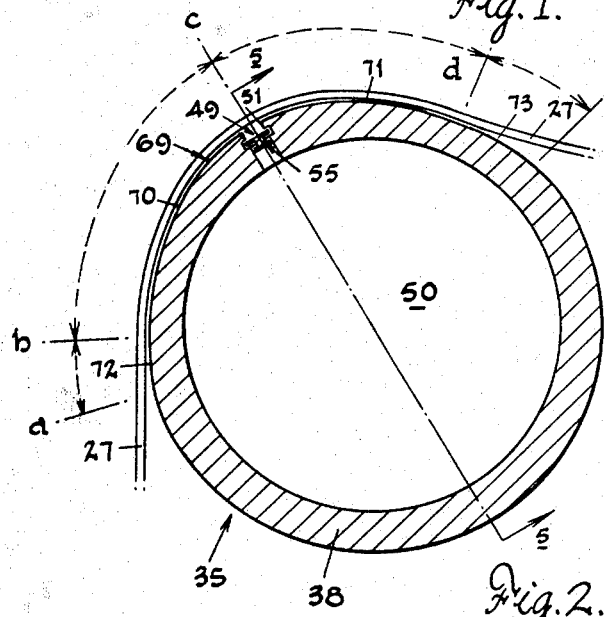
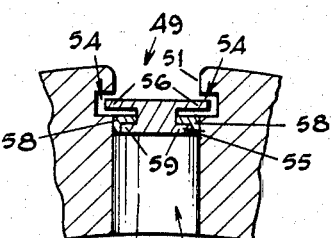
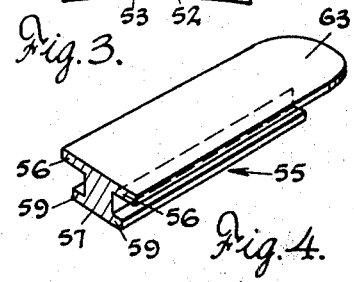
INVENTORS
William E. McCown,
Donald W. Dunipace and
BY Norman K. Gladieux
Nobbe & Collins
ATTORNEYS

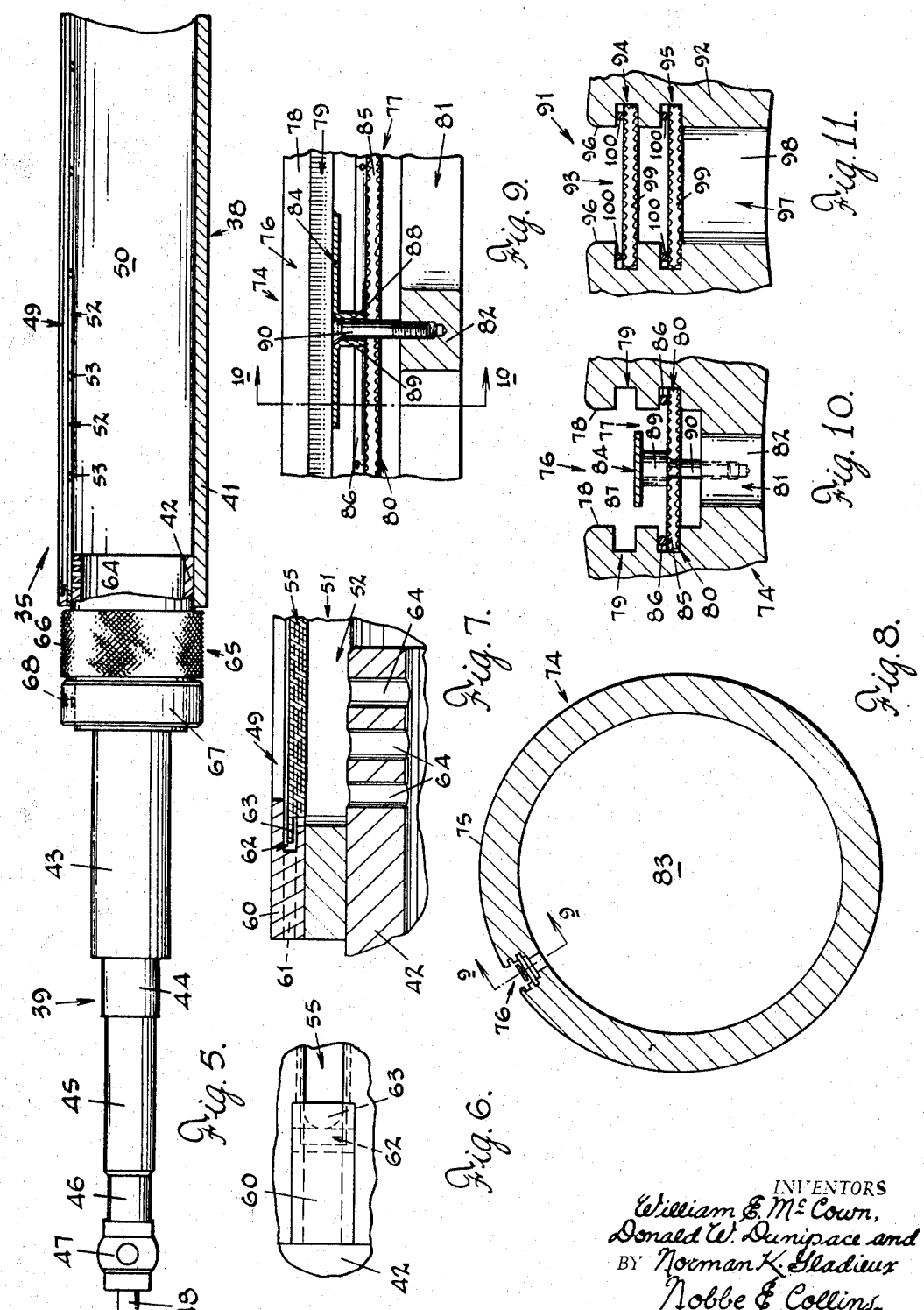

INVENTORS
William E. McCown,
Donald W. Dunipace and
BY Norman K. Gladieux
Nobbe & Collins
ATTORNEYS United States Patent Office 3,476,539
Patented Nov. 4, 1969

1

3,476,539
PRODUCING SHEET GLASS
William E. McCown and Norman K. Gladieux, Toledo, Ohio, and Donald W. Dunipace, Boulder, Colo., assignors to Libbey-Owens-Ford Company, Toledo, Ohio, a corporation of Ohio
Continuation-in-part of application Ser. No. 519,087, Jan. 6, 1966. This application Apr. 28, 1967, Ser. No. 634,575
Int. Cl. C03b 15/04
U.S. Cl. 65—25                    18 Claims

ABSTRACT OF THE DISCLOSURE

Supporting a continuous sheet of glass for movement along a predetermined path while in a highly heated plastic condition. The sheet is moved over a stationary curvilinear surface having an ever changing radius of curvature decreasing from the points of tangency with the sheet toward a common line intermediate thereof, and a fluid film is interposed between the stationary curvilinear surface and the sheet to float the sheet upon the film and out of contact with the curvilinear surface as it passes thereover.

---

This application is a continuation-in-part of application Ser. No. 519,087, filed Jan. 6, 1966, now abandoned.

BACKGROUND OF THE INVENTION

Field of the invention

The present invention relates broadly to the production of sheet or window glass by the so-called Colburn process and, more particularly, to an improved means of supporting the sheet or ribbon as it is drawn upwardly from a mass of molten glass and deflected into a substantially horizontal plane for passage through an annealing lehr.

Description of the prior art

As explained in U.S. Patent No. 3,137,556, issued June 16, 1964, "window" or "sheet" glass, which is flat, drawn glass having fire polished surfaces attained during formation of the sheet as opposed to "plate" glass which has mechanically ground and polished surfaces, is produced in accordance with one well-known process by drawing a sheet or ribbon upwardly from a mass of molten glass and deflecting it over a so-called bending roll while in a highly heated, plastic condition. A major disadvantage of drawing sheet glass in this manner has been the adverse effect which the bending roll may have on the surface quality of the sheet. When the highly heated plastic sheet comes in direct contact with the roll, slight imperfections in the roll surface imprint on the surface of the sheet to cause the undesirable condition in the sheet known as bottom dirt, and the combination of these imperfections with temperature conditions of the roll and surface of the glass ribbon cause an undesirable condition on the bottom surface of the sheet known in the art as sheen. Production speed is also limited by the amount of heat which can be removed from the sheet through contact with the bending roll.

In order to avoid this direct contact between the bending roll and sheet and thereby eliminate the undesirable effects upon the sheet occasioned thereby, it has been proposed to provide the roll with a porous surface through which an aeriform fluid is forced to create a film or cushion between the sheet and porous material. Thus the roll remains stationary while the sheet is moved thereover on the film. However, this has not proved entirely satisfactory in that it is extremely difficult to maintain a film of uniform thickness over the entire segment of roll surface about which the sheet is deflected. Thus, the sheet

2 may drag across the roll surface in certain areas and balloon in other areas so that serious defects are created therein.

SUMMARY OF THE INVENTION

According to the present invention, the sheet is deflected about a stationary curvilinear surface having an elongated slot extending longitudinally thereof beneath the sheet. An aeriform fluid such as air is forced through the slot and between the curvilinear surface and the sheet to create a thin uniform film upon which the sheet is carried over the roll and out of direct contact therewith.

A primary object of the present invention is to support a glass sheet while in a highly heated, softened condition without causing damage to the sheet which might impair its optical clarity.

Another object of the invention is to support such a sheet without imparting defects to its surface through direct contact with a rigid supporting member.

Another object is to deflect a continuous glass sheet while in a highly heated, softened condition from a vertical plane into a substantially horizontal plane about a stationary supporting member while supported by a film of aeriform fluid.

Still another object is to deflect a continuous glass sheet while so supported without having any areas of the sheet either drag across or balloon away from the supporting member.

Other objects and disadvantages of the invention will become more apparent during the course of the following description when taken in connection with the accompanying drawings.

BRIEF DESCRIPTION OF THE DRAWINGS

In the drawings, wherein like numerals are employed to designate like parts throughout the same:

FIG. 1 is a longitudinal vertical section through the drawing chamber area of a sheet glass furnace utilizing one embodiment of the invention;

FIG. 2 is a transverse section through a bending member such as is illustrated in FIG. 1;

FIG. 3 is an enlarged fragmentary view of the fluid supply slot portion of the bending member illustrated in FIG. 2;

FIG. 4 is a perspective view illustrating an end portion of the baffle positioned in the fluid supply slot in FIG. 3;

FIG. 5 is a fragmentary longitudinal view of the bending member, partially in section along line 5—5 of FIG. 2;

FIG. 6 is an enlarged fragmentary plan view of one end of the fluid supply slot;

FIG. 7 is an enlarged fragmentary longitudinal sectional view of the end of the slot;

FIG. 8 is a transverse sectional view of an alternate embodiment of the bending member;

FIG. 9 is an enlarged fragmentary section taken substantially along line 9—9 of FIG. 8;

FIG. 10 is a fragmentary sectional view of the fluid supply slot taken substantially along line 10—10 in FIG. 9;

FIG. 11 is a view similar to FIG. 10 but showing a different arrangement of fluid diffusing members within the slot;

DESCRIPTION OF THE PREFERRED EMBODIMENTS

Figure 12:
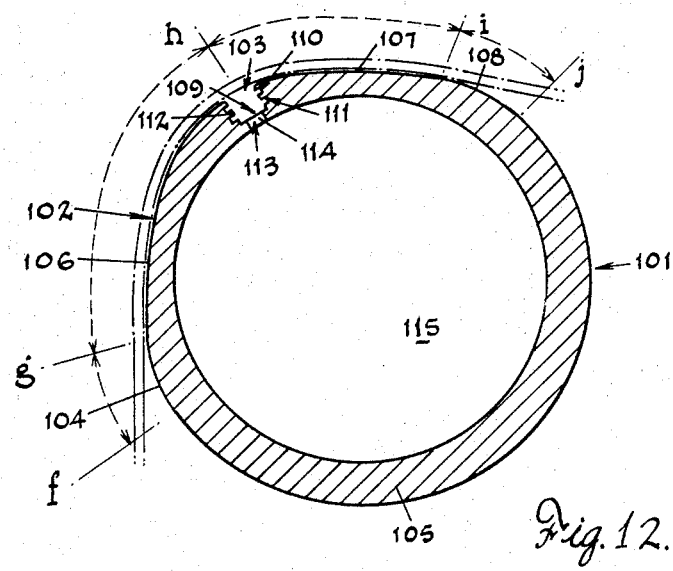
FIG. 12 is a transverse sectional view of another bending member constructed in accordance with the invention.

While the invention is illustrated and described herein with particular regard to production of window glass in accordance with the Colburn process, for which it is particularly well suited, it will be readily appreciated that it is applicable to the supporting and conveying of plastic or flexible sheet material generally such as, for example, in removing the sheet from the molten metal bath in the so-called float process of producing glass.

Referring now to the drawings, and particularly to FIG. 1, there is shown generally at 20 the outlet end of the cooling chamber of a continuous tank furnace of any conventional or preferred construction in which a mass of molten glass is continuously produced, refined and cooled to proper working temperature. The molten glass, indicated at 21, flows from a cooling chamber 22 through an opening 23 beneath a cooling chamber end wall 24 into a working receptacle 25 to form a relatively shallow pool of molten glass 26 from which is continuously drawn a sheet or ribbon 27. Front and rear lip-tiles 28 and 29 located over the molten glass at the entrance end and rear, respectively, of the working receptacle create a quiescent zone over the molten glass and through which the sheet is drawn during its formative stage.

Pairs of knurled rolls 30 conventionally engage the sheet along either margin to establish and maintain it at the proper width, and coolers 31 are located opposite either surface in the usual fashion to absorb heat from the sheet by radiation as it is drawn upwardly. The sheet 27 is drawn vertically for a short distance within the drawing chamber, designated generally at 32 and comprising the end wall 24, a roof 33 and opposite side walls 34, and is then deflected about a bending member 35 for passage through an annealing lehr 36 on a series of horizontally aligned lehr or machine rolls 37.

In creating a thin uniform layer of fluid between the sheet and the surface of the supporting or bending member as it passes thereover, so that the sheet neither drags over the surface in some areas nor balloons in other areas, the relationship between the configuration of the supporting surface, the type of slot through which the aeriform fluid medium is emitted, the baffling and diffusing means within the slot, and the hollow interior or plenum of the bending member, has been discovered to be of particular importance.

There is shown in FIGS. 2 through 7 one form of bending member which has been found to perform extremely well in this respect. The bending member 35 as shown therein is generally cylindrical in shape and includes a tubular central sheet supporting section 38 having affixed to its ends trunnion sections 39, one of which is shown in FIG. 5. During normal operation, the bending member remains stationary with the sheet moving thereover on the fluid film as will be hereinafter described. However, it is contemplated that the device may be operated in the manner of a conventional bending roll during installation, starting of the sheet, or at such other times as operating difficulties are encountered. For this purpose, the bending member is journalled at one end in a conventional drive system with overriding clutch as shown generally in broken lines at 40 in FIG. 1, and the other end is journalled and supported in the usual manner (not shown) for bending rolls.

The tubular central section 38, as best shown in FIG. 5, comprises a generally cylindrical member 41 whose ends receive tubular extensions 42 for a purpose to be described. The end or trunnion sections 39 are affixed to these extensions and include reduced tubular intermediate segments 43 and 44 joined to a bearing section 45. These bearing sections 45 are received in the above-described journals at either end for supporting the bending member. A pipe extension 46 is secured to the outer end of each bearing section, and rotary couplings 47 on the pipe extensions at either end of the bending member are connected through a tube 48 to a source (not shown) of air or other aeriform fluid under pressure.

The ribbon or sheet, which may be on the order of 9 to 13 feet in width, is carried over and deflected about the tubular central section 38 of the bending member. As discussed above, a fluid film is formed between the surface of the bending member and the sheet so that direct contact therebetween is avoided and the defects normally caused in the sheet by this contact are avoided. In order to form this fluid supporting film, a fluid supply slot, indicated generally at 49, extends longitudinally along the tubular central section 38 of the bending member beneath the sheet and terminates somewhat inwardly of its ends. The supply slot is in open communication with the interior 50 of the tubular section 38, which acts as a plenum, and fluid admitted through the tube 48 is expelled through the slot to disperse and form the supporting film beneath the sheet.

As pointed out above, the type of slot and the manner in which the fluid passes therethrough from the interior of the roll are important factors in establishing a suitable supporting film without adversely affecting the sheet. The tubular member 38 generally has a nominal outside diameter of from about 9 to 18 inches. For example, one embodiment which performed very well and which is illustrated in FIGS. 2 and 5, had a diameter of 14 inches. The slot 49 is formed by machining or otherwise forming a continuous recess 51 in the surface of the tubular member throughout the length of the slot. For ease of fabrication as will be hereinafter explained, the recess preferably is formed throughout the entire length of the tubular section, and the ends are then closed. Elongated slots 52, which open to the interior 50 of the tubular section, are formed at the bottom of the recess. The adjacent elongated slots are separated by strengthening ribs 53 joining the tubular section at opposite sides of the slot.

It has been found that if fluid is emitted through the slot in such a manner as to impinge upon the sheet in streams or concentrated areas of varying intensity, longitudinal streaks may be formed in the sheet. In order to diffuse the fluid and prevent longitudinal streaking, a baffle may be provided in the slot. The baffle may take any one of several forms or a combination of devices may be employed within the slot as baffling means. In the embodiment of FIGS. 2 through 7, the side walls of the recess 51 are provided with grooves 54, and a substantially T-shaped baffle 55 is positioned in the recess with its flanges 56 received in, but spaced from, the grooves 54. The base 57 of the baffle rests on the ribs 53, and the baffle is held in place by clips 58 which extend over extensions 59 on the base and are secured to the ribs and walls of the recess 51. As will be described hereinafter, the grooves may also be used to mount a screen or other pervious member within the slot.

In assembling the baffle in the slot, the recess preferably is open at the ends of the tubular section 38 as pointed out above, with the clips 58 secured in place. The baffle is then inserted from the end with the extensions 59 beneath the clips 58. With the baffle in place, the ends of the slot are closed in a suitable manner so that fluid does not escape therefrom. For example, the ends of the slot may be welded shut and the weld ground off to provide a smooth surface contiguous with that of the tubular section 38. Preferably however, the end of the slot is closed by an insert 60, as best shown in FIGS. 6 and 7, which can be press fitted into the end of the recess 51 so that it can be readily removed to change the baffle 55 should the need arise. The insert has shoulders 61 which are received in the grooves 54, and its upper surface is flush with the surface of the tubular section 38. At its inner end, the insert is notched at 62 to receive a projection 63 on the end of the baffle 55, and thereby provide a tortuous path for fluid from the slots 52.

As will be noted in FIGS. 5 and 7, the bearing extension 42 projects into the tubular section 38 beyond the end of the endmost elongated slot 52, so that it blocks off a portion of the slot from direct access to the interior 50 of the tubular section. In order to provide access for the fluid to the end of the slot 52, a plurality of apertures 64 are provided in the wall of the bearing extension beneath the slot.

At either end of the tubular section 38 is a freely rotatable sleeve 65 having a knurled surface 66 upon which the marginal edges of the sheet ride in passing over the bending member. The knurled sleeves are journalled on the bearing extensions in a suitable manner as by the use of pairs of concentric Stellite rings (not shown) secured one to the sleeve and the other to the bearing extension. The sleeves, which are freely rotatable in response to passage of the glass sheet thereover, are driven by the sheet and the friction between the sleeves and sheet margins is sufficient to prevent the sheet from narrowing or necking in as it is deflected about the bending member. The width of the ribbon is established by the pairs of knurled width maintaining rolls 30, and this width is maintained and the sheet is guided as it passes over the bending member on the fluid film by having its margins ride upon the sleeves 65.

Since the marginal portions of the sheet which ride upon the knurled sleeves 65 are distorted and must be removed as waste, it is desirable to minimize the width of the knurled sleeve and the marginal areas of the sheet which ride thereon. For example, it has been found that with a sheet width of 150 inches, a marginal width of 5 or 6 inches riding on the knurled sleeve is adequate to maintain the width of and guide the sheet. Under such circumstances, even though the knurled sleeve may be on the order of 10 inches in width it is conceivable that the edges of the sheet may extend outwardly beyond the knurled sleeve upon occasion. In order to prevent the sheet from becoming fouled in the event that this should happen, a stationary collar 67 may be affixed to the bearing extension 42 outwardly of the sleeve 65 as by a set-screw 68. Thus, should the sheet extend beyond the rotatable sleeve 65, its margin will slide over the stationary collar 67 without becoming fouled.

As described above, the configuration of the surface of the bending member over which the sheet passes is an important factor in enabling the sheet to be supported on a fluid film out of contact with the supporting surface. The sheet is generally on the order of 9 to 13 feet in width as it is deflected about the bending member, and it must be uniformly supported across its width in order to avoid creation of distortion therein. It is also necessary to maintain a quiescent atmosphere within the drawing chamber in and around the zone of sheet formation in order to form a sheet free from undesirable defects such as surface distortion and thickness variations. Thus the effect of the air or other fluid forming the supporting film escaping into the enclosed drawing chamber should be minimized. This can be accomplished by a proper selection of surface contour, slot arrangement and temperature and pressure of the fluid. In this regard, the fluid is heated by a preheater (not shown) to a temperature in the range from about 500° to 1400° F. before being supplied to the chamber 50. Heating the aeriform fluid to a temperature of about 1250° F. has been found to give particularly satisfactory results, and with the fluid heated to this temperature there is an added advantage in that as the fluid escapes from between the bending member and sheet toward the surface of the pool of glass 26, it forms a heated layer or curtain protecting the surface and base of the sheet from convection currents and cold air drafts which normally occur adjacent the sheet surfaces due to the well-known chimney effect created by the coolers 31. Preventing or reducing this uneven cooling due to convection currents causes a corresponding reduction in thickness variation across the sheet.

As illustrated in FIG. 2, the tubular central section 38 of the bending member 35 has a contoured segment 69 formed on its outer surface, about which the sheet or ribbon 27 is actually deflected on the fluid film. Ideally, in floating the glass ribbon over the bending member, the tension at all points therein should be substantially equal. Assuming there is no appreciable friction between the ribbon and bending member due to the fluid film therebetween, it will be seen that this condition is approximately attained. It has been determined that the longitudinal tension at any given point in the glass sheet in the region in which it is supported on the fluid film in passing over the bending member is approximately equal to the product of the pressure in the fluid film and the radius of curvature of the curvilinear supporting surface at that point. This relationship can be defined by the formula $T=PR$, where T is tension in the ribbon in pounds per inch of ribbon width, P is pressure in the fluid film in pounds per square inch, and R is radius of curvature of the supporting surface in inches. In the Colburn process, the sheet rises vertically and follows the surface of the bending member until it has been deflected through an angle in the range from about 85° to 130° for passage through the annealing lehr. Thus, while the sheet normally rises vertically from the molten mass and is carried horizontally through the annealing lehr, due to differences in elevation of the bending member and first lehr roll and the fact that a certain amount of sag occurs in the sheet between the bending member and first lehr roll, the sheet will follow the surface of the bending member so as to be deflected through an angle of at least 85° and up to about 130° between the points of tangency in the vertical and horizontal directions. The position of the bending member relative to the surface of the pool of molten glass 26 and the lehr rolls 37 may be varied to suit different operating conditions, such as the thickness of the ribbon and the speed of draw thereof. For example, the top of the bending member may be positioned from 24 inches to 48 inches or more above the surface of the molten glass, and may be slightly below to as much as 10 inches or more above the first lehr roll 37. Of course, if for any reason the sheet did not rise vertically as it approached the bending member, or if the lehr were not horizontal, it is contemplated that the sheet might follow the surface of the bending member through an interval of less than 85° or greater than 130°.

The fluid for forming the supporting film is introduced in the intermediate region of the path of the sheet about the bending member. Although the slot 49 is located intermediate the points of tangency between the sheet and the bending member, it has been found that under certain circumstances it may advantageously be located somewhat off the medial line of the contoured surface 69. In other words, the sheet may be deflected through a greater angle on one side of the slot than on the other.

The pressure in the film, which is dependent upon a number of factors such as the weight of the glass ribbon and the position of the bending member relative to the first lehr or machine roll, is greatest at the slot, of course, and decreases to the points of tangency where the fluid escapes into the atmosphere from between the sheet and bending member surface. This pressure drop is approximately parabolic or, in other words, the rate of change is most rapid at the lines of tangency and decreases toward the intermediate area of the film to a minimum at the slot. Thus, it will be seen that the desired configuration of the contoured surface may differ on opposite sides of the slot 49, depending upon the position of the slot relative to the points of tangency. In accordance with the above-discussed formula $T=PR$, the radius of curvature of the bending member surface should theoretically change continuously as a parabolic function in response to changes in pressure from the intermediate area where the fluid is interposed between the sheet and supporting surface to the points of tangency where it approaches and departs from the surface. More particularly, the radius of curvature should ever increase, substantially as a parabolic function, from a minimum in the central region adjacent the slot and approach infinity at the points where the sheet approaches and departs from the surface since the pressure approaches zero at these points as the fluid escapes into the atmosphere.

The ideal theoretical contour is a function of a number of variables, such as the diameter of the tubular section 38, angle through which the sheet is deflected in following the curvilinear surface, position of the slot relative to the points of tangency with the sheet, and pressure drop conditions from the slot to the points of tangency. However, it has been found that a bending member utilizing a particular type of slot such as shown at 49 and having an approximation of the theoretical contour formed thereon will satisfactorily carry the sheet under varying conditions of operation so that it is unnecessary to change the bending member each time the thickness of the sheet or its rate of draw is altered. Under certain circumstances, a slot as disclosed herein may be utilized with a bending member having a cylindrical outer surface to carry the glass sheet thereover on a fluid film.

More particularly the contoured segment 69 of the tubular section 38, as illustrated in FIG. 2, includes substantially parabolic contoured segments 70 and 71 on the tank and lehr sides, respectively, of the slot 49. Circular curves 72 and 73 of smaller radius than that of the outer surface of the tubular section 38 join the ends of the contoured segments 70 and 71, respectively, to the cylindrical surface of the tubular section and provide a smooth transition between the contoured and cylindrical surfaces. The contoured segments 70 and 71 correspond to segments $bc$ and $cd$, respectively, in FIG. 2, while the transition curves 72 and 73 correspond to segments $ab$ and $de$ therein. The circular transition curves are tangent to the cylindrical surface of the tube 38 at their junctures $a$ and $e$ therewith, and to the contoured segments 70 and 71 at their junctures $b$ and $d$, respectively.

In one specific embodiment constructed in accordance with FIG. 2, the tubular section 38 had an outside diameter of 14 inches with a wall thickness of 1¼ inches, so that the interior 50 had a diameter of 11½ inches. The slot 49 was ⅝ inch in width and 1¾₁₆ inch in depth to the top of the strengthening ribs 53, with the grooves 54 being ¾₁₆ inch in height and depth and located ¾₁₆ inch below the adjacent outer surface of the tubular section. In following the contoured segment 70 on the tank side of the bending member the sheet was deflected through an angle of about 65°, and in following the segment 71 on the lehr side of the bending member it was deflected through an additional angle of about 40°. At the slot 49 the radius of curvature of the segment 70 was 5.1 inches and the radius ever increased to infinity at the point of tangency $b$ with the circular transition curve 72. The segment 71 likewise had a radius of 5.1 inches adjacent the slot with the radius ever increasing to infinity at the point of tangency $d$ with the circular transition curve 73. The radius of curvature of the transition curves was 3⅝₁₆ inches, and the bending member was installed in operative position with the center line of the slot 49 inclined 25° toward the tank from vertical.

The extent of each of the contoured segments 70 and 71, that is, the angle through which the sheet is deflected in following them depends, among other factors, upon the angle from vertical at which the slot is installed and the position of the first lehr roll relative to the bending member. The slot is normally installed at an angle of from 15° to 45° from vertical toward the tank. Thus, it is contemplated that the two segments may deflect the sheet by equal amounts or by any combination which will cause it to be deflected through the desired angle for passage through the annealing lehr.

In operation, air or another suitable aeriform fluid such as, for example, carbon dioxide, nitrogen or sulfur dioxide heated to a temperature of about 1250° F. is supplied through the tubes 48 to the interior 50 of the tubular section. The heated air is forced through the elongated slots 52 around the baffle 55 and between the flanges 56 and grooves 54 to create the film between the sheet and surface 69 of the tubular section 38. The baffle diffuses the air and prevents it from impinging directly upon the under surface of the sheet in directed, definite streams whereupon it might damage the sheet. The baffle serves the additional purpose of creating a pressure drop between the chamber 50 and fluid film to damp out pressure fluctuations between the chamber and film. Due to the relatively large supporting area of the tubular section 38, a pressure within the chamber 50 of only about ½ to ¾ pound per square inch will successfully float a sheet of double strength window glass over the bending member completely out of contact therewith.

In the specifically described embodiment of FIG. 2, the segments 70 and 71 are unequal in length and thus have different contours. It will thus be appreciated that the contoured surface can have a variety of configurations, depending upon factors such as the thickness of the sheet to be produced and the type of fluid supply slot employed therewith. There is illustrated in FIG. 8 an embodiment of the invention utilizing a tubular central sheet supporting section 74. The embodiment is identical to that of FIG. 2 except for the tubular section, which has a cylindrical outer surface 75 and a fluid supply slot 76 particularly adapted to form a fluid film for carrying the sheet over a portion of the cylindrical surface 75 and out of contact therewith. While a roll of this type may, in certain instances, be employed as a bending member it also has particular utility as a supporting member for highly heated glass sheets in other applications. Thus, it may be employed in removing the glass sheet from the molten metal bath in the float process as earlier described. It may also be advantageously employed to support a sheet produced as disclosed herein while still in a highly heated plastic state after it has been deflected about the bending member 35. For this purpose, one or more of the rolls may be substituted for the first lehr rolls 37, or they may be positioned between the bending member and the first of the conventional lehr rolls. They can, of course, be rotated and operated as conventional rolls when desired.

As best shown in FIG. 10, the slot 76 has a continuous recess 77 which is somewhat deeper than the recess 51 of the previous embodiment. The opposite side walls 78 of the recess are provided with upper and lower grooves 79 and 80, respectively, for a purpose to be hereinafter described. Elongated slots 81, separated by spaced strengthening ribs 82, are formed at the bottom of the recess to provide a passage between the recess 77 and the hollow interior 83 of the tubular section. It will be appreciated that while the configuration of the slot 76 is particularly adapted for use with the cylindrical surface 75, it may also be employed in a bending member having a contoured surface as in the embodiment of FIG. 2. The slot is illustrated in FIGS. 8 to 10 in a tubular member 74 having a diameter of 18 inches and a wall thickness of 1½ inches. The continuous recess 77 is 1 inch in width and 1 inch in depth, while the elongated slots 81 are about ⅝ inch in width.

The increased width and depth of the continuous recess permits greater diffusion of the fluid as it is emitted from the slots 81 so that it impinges against the under surface of the sheet more uniformly and spreads out evenly to form the fluid film. To assist in this diffusion of the fluid prior to emission from the recess, a baffle assembly, identified generally at 84, is mounted within the recess. The baffle assembly includes an elongated screen 85 extending throughout the length of the recess and across its entire width with its edges received in the lower grooves 80. The screen is of a material able to withstand prolonged periods of high temperature without deteriorating, such as stainless steel, and sealing strips 86 such as lengths of wire are wedged into the grooves 80 along its edges to prevent leakage of streams of fluid around the screen which might impinge directly against the sheet and cause longitudinal streaks therein. Alternatively, a porous or foraminous material may be employed in place of the screen.

A baffle plate 87 may extend longitudinally above the screen to further diffuse the fluid and prevent it from following a direct path through the slots 81 and screen 85 against the sheet. The baffle plate is perforated as at 88 to form a plurality of bosses 89 spaced along its length. The bosses act as spacers for positioning the baffle plate at the proper height above the screen, and screws 90 passing through the perforations are tapped into the strengthening ribs 82 to hold the baffle plate in place.

There is shown in FIG. 11 an alternate embodiment of the fluid supply slot which may be utilized with a tubular central section such as is shown in either FIG. 2 or FIG. 8. The slot, indicated generally at 91, is illustrated and will be described as applied to a tubular central section 92 having a wall thickness of 1½ inches although it can be readily adapted to tubular sections having different diameters and wall thicknesses. In this embodiment, the continuous recess 93 is about 1 inch in width and ¾ inch in depth. Upper and lower grooves 94 and 95, respectively, are formed in the opposite side walls 96 of the recess, with the lower grooves being at the bottom of the recess. A plurality of elongated slots 97, separated by strengthening ribs 98, provide communication between the recess 93 and the interior of the tubular member. The elongated slots are the same width as the recess 93 so as to provide a continuous channel for passage of the fluid medium. Diffusion of the fluid is accomplished by a dual screen arrangement wherein screens or porous or foraminous members 99 are received within both pairs of grooves 94 and 95 and extend throughout the length of the slot. Sealing strips 100 prevent fluid from leaking around the edges of the screens.

With an arrangement of this type, the bottom screen is preferably more dense than the top screen or, in other words, the top screen has greater porosity than the bottom one. The screens thus create a pressure drop and form a plenum in the space therebetween to damp out pressure fluctuations between the interior of the bending member and the film. The upper, more porous screen breaks up jets created by the lower screen. Screen porosity or density may be defined in terms of the volume of air in cubic feet per minute at standard temperature and pressure which will pass through a one square foot specimen of the screen with a pressure drop of 0.1 p.s.i. Based upon such a definition, good results have been achieved using a 250 c.f.m. lower screen in combination with a 500, 750 or 1000 c.f.m. top screen. Likewise, good results have been achieved using a 500 c.f.m. lower screen in combination with a 750 or 1000 c.f.m. top screen.

The embodiment of FIG. 10 is provided with two pairs of grooves 79 and 80 in order that this same dual screen fluid diffusing arrangement might be employed therein. Likewise, it is fully contemplated that the baffle assembly 84 of FIG. 10 might be employed in the slot 91 of FIG. 11 where operating conditions warrant.

There is shown in FIG. 12 an embodiment of the invention wherein a tubular central section 101 is provided which a contoured segment 102 about which the sheet 27 is deflected, and with a deep fluid supply slot 103. This embodiment differs from that of FIG. 2 primarily in the construction of the slot 103. Thus, on the tank side of the bending member a circular transition curve 104 of smaller radius than the tubular member and corresponding to the segment *fg*, connects the cylindrical surface 105 of the tubular member with a substantially parabolic contoured segment 106 which corresponds to the segment *gh*. On the lehr side, a substantially parabolic contoured segment 107 extends from the slot 103 and merges into a circular transition curve 108 which in turn merges into the cylindrical surface 105. The contoured segment 107 corresponds to the segment *hi* and the transition curve 108 to the segment *ij*. While the contoured segments 106 and 107 do not necessarily cover equal segments of the tubular member as pointed out in connection with the embodiment of FIG. 2, the same principle is utilized in that the radius of curvature of each is smallest at the slot 103 and ever increases to a maximum approaching infinity at the junction with the circular transition curves 104 and 108, respectively.

The slot 103 employed with this particular embodiment is relatively large and has not been illustrated with a baffle or diffusing means disposed therein as have the previous embodiments. More particularly, in a tubular member 101 whose wall thickness is approximately 1½ inches, the slot is formed of a continuous recess 109 which is 1 inch in width and depth. Upper and lower pairs of grooves 110 and 111, respectively, are formed in the side walls 112 of the continuous recess to receive screens or a baffle as in the previous embodiments should one or both become desirable. Elongated slots 113 separated by strengthening ribs 114 of the same width as the recess 109 connect the recess with the interior 115 of the tubular member.

Figure 13:
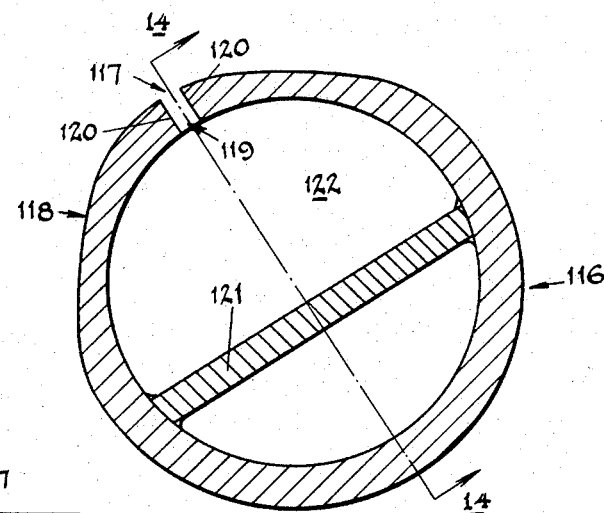
FIG. 13 is a transverse sectional view of still another bending member embodying the invention.
Figure 14:
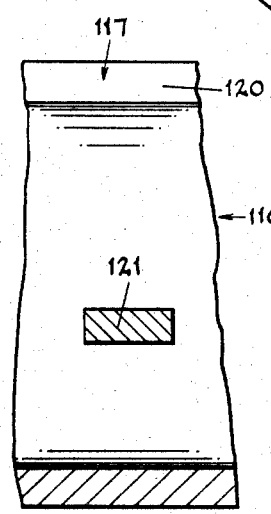
FIG. 14 is an enlarged fragmentary longitudinal section taken substantially along line 14—14 of FIG. 13.

There is illustrated in FIGS. 13 and 14 a tubular central section 116 of a bending member having a completely unobstructed fluid supply slot 117. While the tubular section is illustrated with a contoured segment 118 formed on its outer surface similar to that of FIG. 12, it is contemplated that it could also employ a contoured surface which is symmetrical about the fluid supply slot or a cylindrical surface such as is shown in FIG. 8. The fluid supply slot comprises a continuous recess 119 extending substantially the length of the tubular member and having side walls 120. Since the recess extends the full depth of the walls 120 and does not have obstructions such as strengthening ribs extending thereacross, it is generally unnecessary to provide a baffle or diffusing means. However, should they be required, the side walls 120 can be provided with grooves for receiving a baffle or screens as in the previous embodiments. In order to strengthen the tubular sections and compensate for the completely open slot, a series of spaced struts 121 are provided across the interior 122 thereof.

We claim:

1. In apparatus for supporting a continuous sheet of glass for movement along a predetermined path while in a highly heated plastic condition, the improvement comprising a supporting member having a curvilinear surface over which said sheet moves following the contour thereof, the radius of curvature of said curvilinear surface ever-decreasing from the lines of tangency between said sheet and surface toward a common line intermediate thereof, and means interposing a fluid film between the sheet and the curvilinear surface to support said sheet out of contact with said curvilinear surface as it moves thereover.

2. Apparatus for supporting a continuous sheet of glass for movement along a predetermined path while in a highly heated plastic condition as claimed in claim 1, in which the curvilinear surface has a contour such that the product of its radius of curvature and the pressure in said fluid film is substantially uniform over said curvilinear surface.

3. In apparatus for producing glass in sheet form including a working receptacle containing a mass of molten glass, means for continuously drawing a sheet upwardly from said mass of molten glass, and a bending member positioned above said molten glass, the improvement comprising a curvilinear supporting surface on said bending member about which the sheet is deflected while in a highly heated plastic condition for passage through an annealing lehr, the radius of curvature of said curvilinear supporting surface ever-decreasing from the lines of tangency between said sheet and supporting surface toward a common line intermediate thereof, and means interposing a fluid film between said curvilinear surface and said sheet.

4. In apparatus for producing glass in sheet form including a working receptacle containing a mass of molten glass, means for continuously drawing a sheet upwardly from said mass of molten glass, and a tubular bending member positioned above said molten glass and mounted for rotation about its longitudinal axis, the improvement comprising a curvilinear supporting surface on said bending member about which the sheet is deflected while in a highly heated plastic condition for passage through an annealing lehr, an elongated slot in the curvilinear supporting surface beneath said sheet and extending transversely thereof, means directing a fluid medium through said slot to form a fluid film between said curvilinear surface and said sheet, and means holding said tubular bending member against rotation with said elongated slot in a predetermined angular position, the radius of curvature of said curvilinear supporting surface ever-decreasing from the lines of tangency where said sheet approaches and departs from said curvilinear surface to said elongated slot.

5. Apparatus for producing glass in sheet form as claimed in claim 4, including a sleeve mounted for rotation at either end of said curvilinear surface for carrying the marginal edges of said sheet.

6. Apparatus for producing glass in sheet form as claimed in claim 5, said sleeves being freely rotatable in response to movement of said marginal edges thereover, and including a stationary supporting collar positioned outwardly of each said sleeve.

7. Apparatus for producing glass in sheet form as claimed in claim 4, wherein said sheet is deflected through an angle in the range from about 85° to 130° in following said curvilinear surface on said fluid film.

8. Apparatus for producing glass in sheet form as claimed in claim 7, wherein said sheet is deflected about said curvilinear surface through an angle in the range from about 50° to 65° on the side of said slot adjacent the upwardly rising sheet and in the range from about 40° to 55° on the side of said slot adjacent said annealing lehr.

9. Apparatus for producing glass in sheet form as claimed in claim 7, in which said tubular member is positioned with said slot inclined about 15° to 45° from vertical in the direction of the upwardly rising sheet.

10. Apparatus for producing glass in sheet form as claimed in claim 4, including a pair of spaced, superimposed screens mounted within said slot for diffusing the fluid and creating a pressure drop therein as said fluid passes through said slot to form said fluid film, the upper one of said pair of screens having greater porosity than the lower one.

11. Apparatus for producing glass in sheet form as claimed in claim 4, including a porous member positioned within said slot and through which said fluid passes, and a baffle plate above said porous member within said slot.

12. In a method of supporting a continuous sheet of glass for movement along a predetermined path while in a highly heated plastic condition, the improvement comprising moving said sheet over a stationary curvilinear surface disposed in said path with said sheet following the contour of said surface, said curvilinear surface having a radius of curvature ever-decreasing from the lines of tangency with said sheet toward a common line intermediate thereof, and introducing a fluid medium between the stationary curvilinear surface and the sheet to create a fluid film and float said sheet upon said film and out of contact with said curvilinear surface as it moves thereover.

13. A method of supporting a continuous sheet of glass for movement along a predetermined path while in a highly heated plastic condition as claimed in claim 12, in which said fluid medium is introduced along said common line intermediate said lines of tangency.

14. A method of supporting a continuous sheet of glass for movement along a predetermined path while in a highly heated plastic condition as claimed in claim 12, wherein the product of the radius of curvature of the path along which the sheet is deflected and the pressure in the fluid film is substantially uniform over said curvilinear surface.

15. In a method of producing a continuous sheet of glass including the steps of maintaining a bath of molten glass and drawing a sheet upwardly from the bath of molten glass, the improvement comprising deflecting said upwardly rising sheet while in a highly heated plastic condition about a stationary curvilinear surface with said sheet following the contour of said surface, said curvilinear surface having a radius of curvature ever-decreasing from the lines of tangency between said sheet and said surface toward a common line intermediate thereof, and interposing a fluid film between the stationary curvilinear surface and the sheet to float said sheet upon said fluid film and out of contact with said curvilinear surface as it moves thereover.

16. A method of producing a continuous sheet of glass as claimed in claim 15, including the step of carrying the marginal edges of said sheet upon moving surfaces as said sheet is deflected about said stationary curvilinear surface.

17. A method of producing a continuous sheet of glass as claimed in claim 15, including the step of preheating the fluid to a temperature in the range from about 500° to 1400° F. before forming said fluid film.

18. A method of producing a continuous sheet of glass as claimed in claim 13, in which said fluid is introduced through the curvilinear surface and is subjected to a pressure drop as it is introduced through said surface.

References Cited

UNITED STATES PATENTS

| 1,554,267 | 9/1925 | Ewing | 144—188 |
| 1,591,179 | 7/1926 | Myers | 340—372 |
| 2,505,103 | 4/1950 | Devol | 65—25 |
| 3,137,556 | 7/1964 | Badger et al. | 65—182 |

S. LEON BASHORE, Primary Examiner

JOHN H. HARMAN, Assistant Examiner

U.S. Cl. X.R.

65—193, 196, 90, 182